United States Patent [19]

Lawassani et al.

[11] Patent Number: 5,169,203
[45] Date of Patent: Dec. 8, 1992

[54] VEHICLE SUN VISOR CATCH

[75] Inventors: Abdi R. Lawassani, Pontiac; David M. Hilborn, Sterling Heights, both of Mich.

[73] Assignee: United Technologies Automotive Inc., Dearborn, Mich.

[21] Appl. No.: 844,981

[22] Filed: Feb. 7, 1992

Related U.S. Application Data

[63] Continuation of Ser. No. 398,586, Aug. 25, 1989, abandoned.

[51] Int. Cl.⁵ ............................................. B60J 3/00
[52] U.S. Cl. ..................................................... 296/97.1
[58] Field of Search ............... 160/370.2, DIG. 3; 292/73; 296/97.1, 97.9, 97.11, 97.12, 97.13

[56] References Cited

U.S. PATENT DOCUMENTS

| | | | |
|---|---|---|---|
| 4,570,990 | 2/1986 | Flowerday | 296/97.1 |
| 4,576,409 | 3/1986 | Ebert | 296/97.1 |
| 4,664,435 | 5/1987 | Dietz et al. | 296/97.1 |
| 4,679,843 | 7/1987 | Spykerman | 296/97.1 |

FOREIGN PATENT DOCUMENTS

| | | | |
|---|---|---|---|
| 275903 | 7/1988 | European Pat. Off. | 296/97.1 |
| 166622 | 7/1988 | Japan | 296/97.1 |

*Primary Examiner*—Johnny D. Cherry
*Assistant Examiner*—Andrew C. Pike

[57] ABSTRACT

A sun visor (6) has a catch (12) for engagement with, and disengagement from, a clip (13) on a center bracket (14). The catch includes a pin (40) received within a cylindrical roller sleeve (41). The ends of the pin are retained in resilient cradles (42,50) mounted to a visor core half (23), and held securely therein by resilient tabs (43,55) mounted to another visor core half (20). The pin is prevented from moving laterally by a resilient tab (51).

2 Claims, 3 Drawing Sheets

VEHICLE SUN VISOR CATCH

This is a continuation application of U.S. Ser. No. 07/398,586 filed Aug. 25, 1989, now abandoned.

TECHNICAL FIELD

This invention relates generally to sun visors for use in motor vehicles, and more particularly to a catch for the engagement of a sun visor with, and disengagement from, a center mounting bracket in a vehicle.

BACKGROUND OF THE INVENTION

Motor vehicle sun visors typically include a pivot arm by which the visor is pivotally attached to an outer (with respect to the center line of the vehicle's interior) mounting bracket, and a catch by which the visor may be removably secured to a center mounting bracket. The pivot arm allows the visor to pivot downwardly from a stowed position against the vehicle headliner to a lowered, use position against the windshield. By releasing the catch, the visor can be disengaged from the center bracket, and the visor can be rotated with the pivot arm to cover a side window if the sun is entering the vehicle from the side. When the visor is no longer needed, it can be rotated back to a stored position, and reattached to the center bracket by the catch.

Such a catch must provide positive visor retention to the center bracket for storage of the visor against the headliner, and for use of the visor in the lowered position. In addition, the catch must provide easy disengagement of the visor from the center bracket for positioning the visor against the vehicle side window, and easy reengagement with the bracket for return to the stored position.

One known means of achieving such ease of engagement and disengagement is to provide the catch with a freely rotatable, cylindrical sleeve at the upper edge of the visor, the sleeve being supported along its center axis by a fixed shaft. The sleeve is freely rotatable about the shaft, whereby the sleeve acts as a roller bearing, requiring minimal force to engage with, and disengage from, a clip on the center bracket. Sun visors employing this catch configuration require less effort to engage with and disengage from the mounting bracket than is required with other catches, and therefore, minimizes operator distraction during normal use of the visor.

Prior art catches which employ such a cylindrical sleeve and shaft arrangement are generally incompatible with known assembly techniques for current high quality sun visors of refined appearance. Such sun visors typically comprise a rigid core covered with upholstery material aesthetically compatible with various vehicle interior fabrics. The catch is usually assembled to the core prior to covering and, unless particularly adapted to the visor in which it is used, can contribute significantly to the cost of assembling the visor.

SUMMARY OF THE INVENTION

Objects of the invention include the provision of an improved sun visor catch which is conveniently assembled to a vehicle sun visor.

According to the present invention, a cylindrical roller sleeve is received over a pin, each end of which is retained by a support in a first, single portion of a visor core. Longitudinal movement of the pin is prevented by an edge of the visor core adjacent to one of the supports, and a stop adjacent to the other support. A pair of tabs on an opposed visor portion holds the pin securely in the supports when the core portions are bonded together to prevent lateral disengagement of the pin from the supports. The sleeve may freely rotate about the axis of the pin.

The present invention represents an improvement over previous visor catches because it exhibits the superior mechanical qualities of being easy to engage with, and disengage from, a center mounting bracket, while being particularly well suited for use in a refined, aesthetically pleasing visor.

The foregoing and other objects and advantages of the present invention will become more apparent in the light of the following detailed description of an exemplary embodiment thereof, as illustrated in the accompanying drawings.

BRIEF DESCRIPTION OF THE DRAWINGS

FIG. 4 is an enlarged perspective view of the catch of the present invention.

BEST MOST FOR CARRYING OUT THE INVENTION

Figure 1:
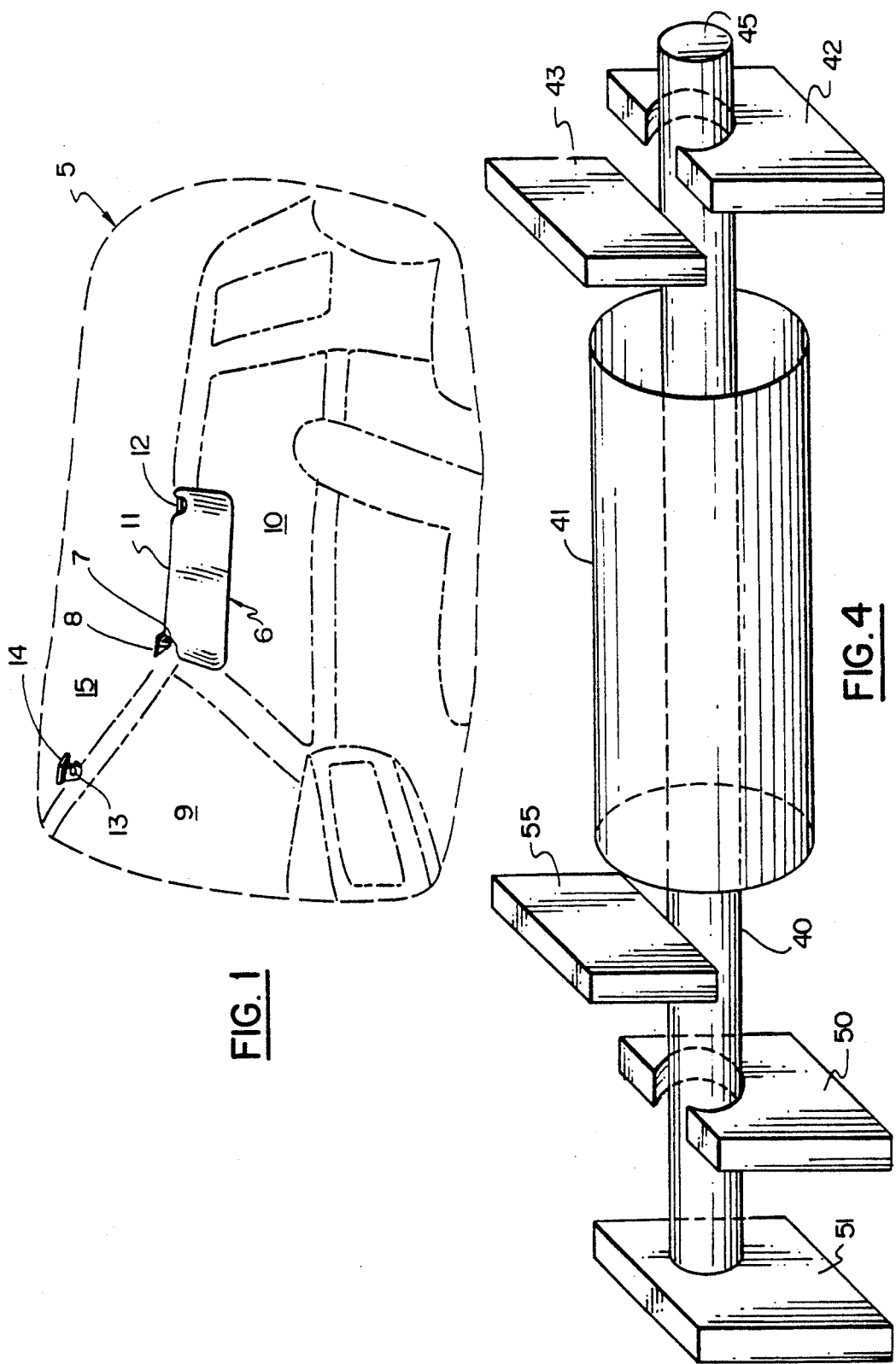
FIG. 1 is a perspective view of a vehicle interior having a sun visor employing the catch of the present invention, disengaged from a center mounting bracket.

Referring to FIG. 1, the interior 5 of a vehicle, such as an automobile or the like, is shown in phantom and includes a sun visor 6, mounted on a pivot arm 7. As is well known, arm 7 is pivotally mounted to a bracket 8 whereby the visor 6 is horizontally pivotable between positions adjacent to a vehicle windshield 9 and a side window 10. An upper (forward) edge 11 of the visor 6 contains a catch 12 which is engageable with a clip 13 mounted on a center bracket 14 located near the center of the vehicle for latching the visor in a position adjacent to the windshield 9 or, by rotating the visor upwardly on the pivot arm 7, in a stowage position against the vehicle headliner 15.

Figure 2:
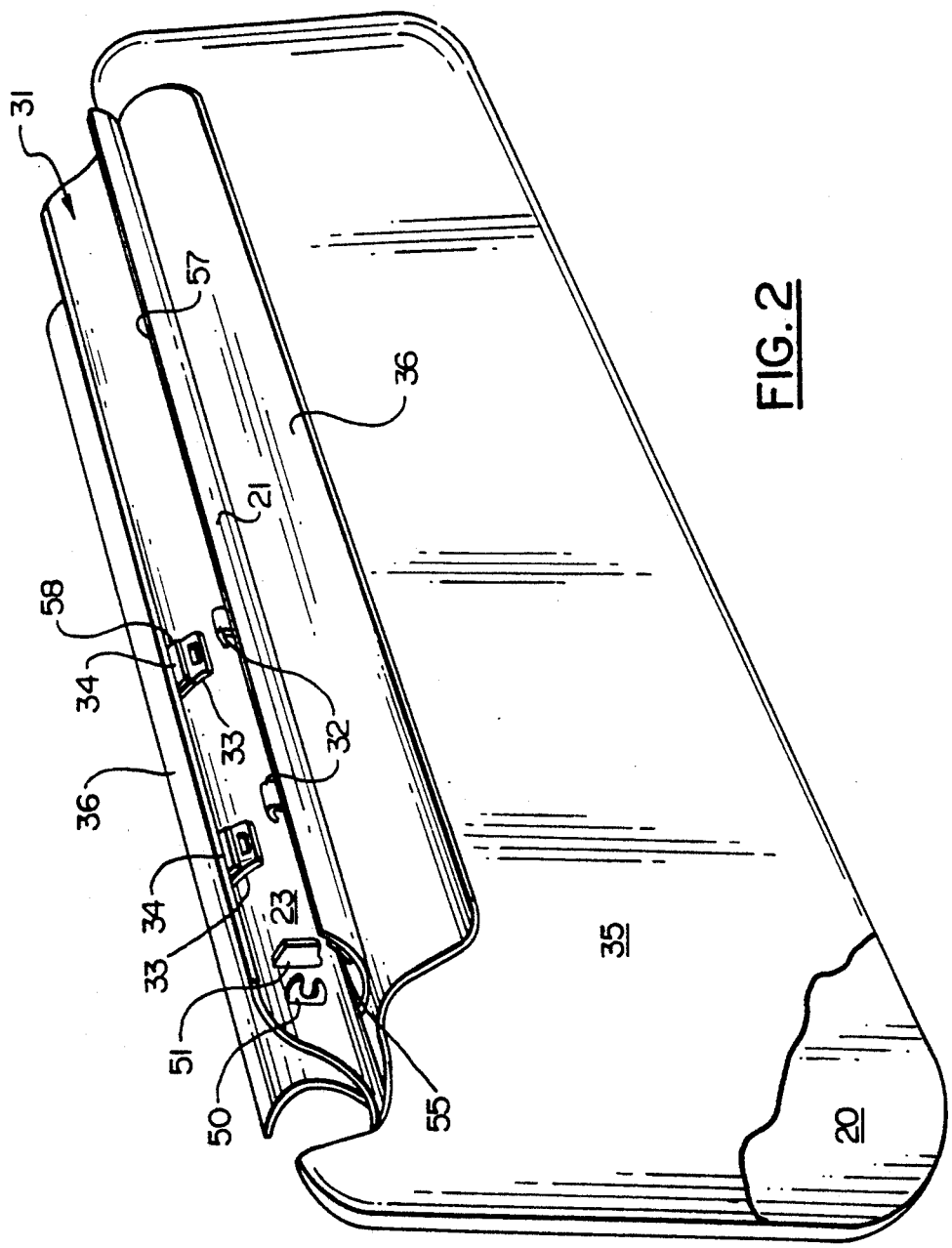
FIG. 2 is a perspective view of the visor shown in FIG. 1 in a state of partial assembly, portions thereof having been broken away to show details of construction.
Figure 3:
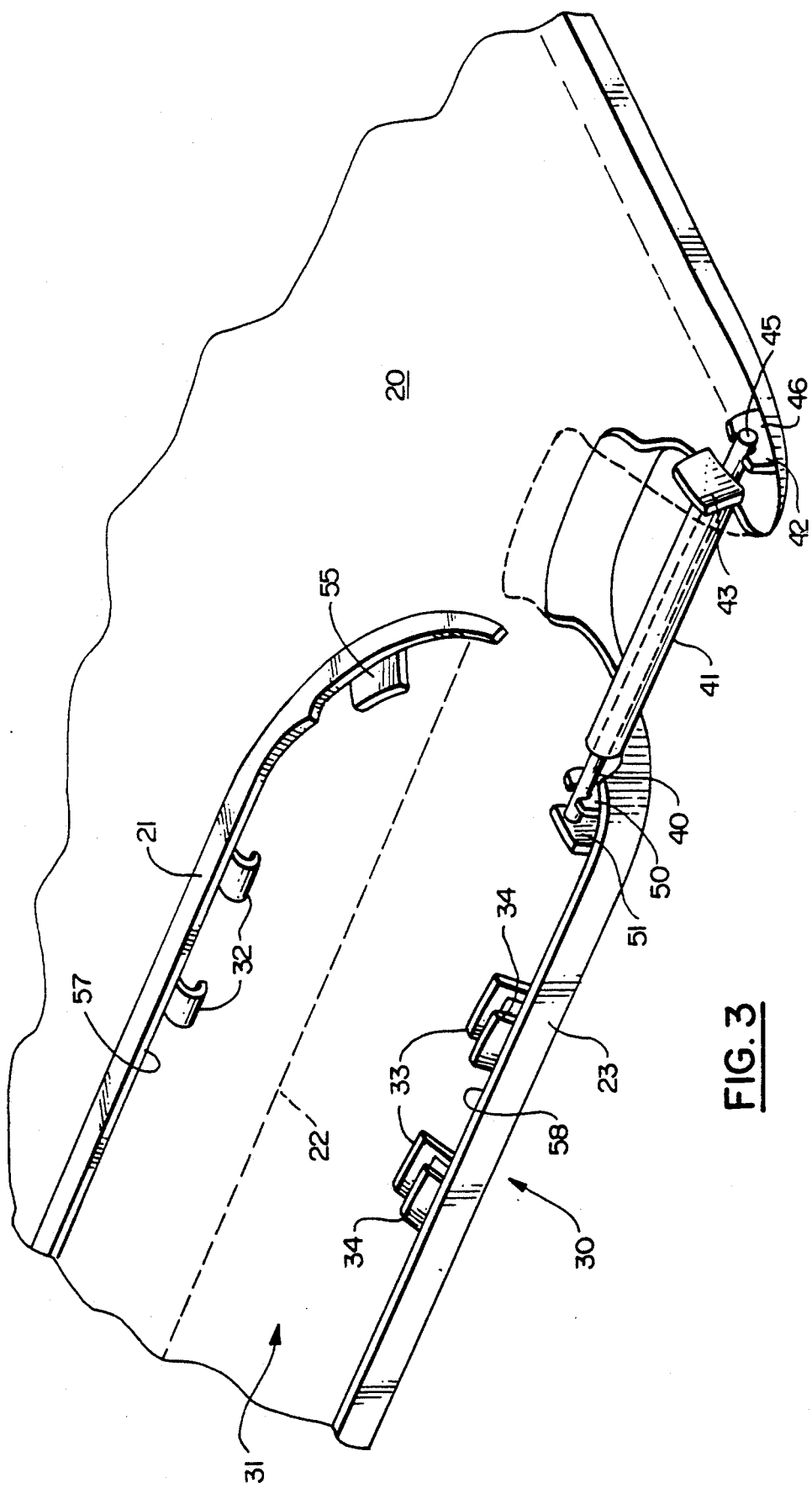
FIG. 3 is an enlarged perspective view of a core employed in the visor of FIG. 1, a flap in the core being shown open.

Referring to FIGS. 1, 2, and 3, a first visor core portion (half) 20 is molded of a suitable material such as polypropylene, with an integral flap 21 pivotable about an integral hinge (living hinge) 22 parallel to the forward edge 11. A second visor core portion (half) 23 is bonded to the first visor core half 20, except for the flap 21, by a suitable adhesion process such as hot-plate fusion. Flap 21 is left open for assembly of catch 12 with the visor core.

The bonded core halves 20, 23 form a visor core assembly 30. The area between the flap 21 and the second visor core half 23 defines a cavity 31. A plurality of snap fasteners are located in the cavity 31 to secure the flap 21 to the second visor core half 23. Each of the snap fasteners comprises a resilient L-shaped dog 32, the ends of which snap-fit into the slotted portion of a resilient slotted plate 33, the ends of the dogs being held securely in the slots by resilient wedge-shaped locking tabs 34 when the flap is closed against the forward edge 11 of the second visor core half 23. A decorative fabric cover (envelope) 35, which is usually color coordinated with fabrics used elsewhere in the interior of the vehicle, is provided in the shape of the assembly 30. Skirts 36 define an opening in the envelope 35 for insertion of the core assembly thereinto.

Referring to FIGS. 3 and 4, the catch 12 of the present invention consists of a pin 40 received in a cylindrical roller sleeve 41. One end of the pin 40 is received in the grooved portion of a first support (resilient cradle) 42 integrally molded into the second visor core half 23 by a snap fit, and securely held therein by a first tab 43 integrally molded into the first visor core half 20. An end of the pin 45 contacts a seam 46 defined by the mating edges of the first and second core halves and is longitudinally restrained thereby. The other end of the pin 40 is snapped into a second support (resilient cradle) 50 integrally molded into the second visor core half 23. A second tab 51 integrally molded into the second visor core half 23 adjacent to the second cradle 50 prevents outwardly longitudinal movement of the pin. A third tab 55 integrally molded into the interior surface of the flap 21 contacts the pin 40 adjacent to the second cradle 50 and laterally restrains the pin within the second cradle 50. Thus it will be understood that the pin is securely fixed in all directions by the various tabs, cradles, and the core seam.

The catch of the present invention is assembled with the visor core assembly 30 and the envelope 35 as follows. As shown in FIG. 2, the core assembly 30 is inserted into the interior of the envelope 35 through the skirts 36. The skirts 36 are folded over the flap 21 and the upper edge of the second visor core half 23 into the cavity 31, and attached thereto along interior edges 57, 58 by adhesive or equivalent technique. This assembly process is the subject of U.S. Pat. No. 4,998,767 entitled "Vehicle Sun Visor and Method of Making". Referring to FIGS. 2, 3, and 4, the pin 40 is inserted in the roller sleeve 41, and the ends of the pin are snapped into the cradles 42, 50. The flap 21 is pivoted about the living hinge 22 to securely snap fasten to the second visor core half 23 by means of snap fasteners 32 and 33. The cylindrical roller remains sleeve free to rotate about the pin 40.

The catch of the present invention is easily operated with clip 13 on the center bracket 14. It is easily and conveniently assembled with the visor core described herein. However, the catch may also be used with other suitable visor cores, such as a core molded in one piece with a movable flap along the forward edge 11, or a simple clam shell core, not employing a movable flap.

The supports 42, 50 and the tabs 43, 51, 55 are shown integrally molded into the visor core. However, there are, of course, other suitable means of mounting these components in accordance with the present invention such as attachment with rivets, screws, or equivalent fasteners, or by adhesive bonding.

Although the invention has been shown and described primarily with respect to an exemplary embodiment thereof, it should be understood by those skilled in the art that various changes, omissions, and additions such as those discussed hereinabove may be made without departing from the spirit and the scope of the invention.

Having thus described the invention, what is claimed is:

1. A catch adapted for attachment to a visor core comprising a first core member and a second, opposed core member, said catch providing a means for engagement of a visor with, and disengagement of a visor from, a mounting bracket, said catch comprising:
   a roller sleeve; and
   a pin received in said roller sleeve, allowing rotation of said sleeve about a longitudinal axis of the pin;
   said catch being characterized by:
   a first support mounted to one of said core members for engaging one end of said pin;
   a second support mounted to one of said core members for engaging another end of said pin;
   a first tab mounted to the other of said core members for laterally maintaining said one end of said pin in engagement with said first support when said core members are fixed together;
   a second tab mounted to said other of said core members for laterally maintaining said other end of said pin in engagement with said second support when said core members are fixed together; and
   a third tab mounted to one of said core members adjacent to said second support for preventing longitudinal movement of said pin.

2. A catch adapted for attachment to a visor core comprising a first core member and a second, opposed core member, said catch providing a means for engagement of a visor with, and disengagement of a visor from, a mounting bracket, said catch comprising:
   a roller sleeve; and
   a pin received in said roller sleeve, allowing rotation of said roller sleeve about the longitudinal axis of said pin;
   said catch being characterized by:
   a first support mounted to one of said core members for engaging one end of said pin;
   a second support mounted to one of said core members for engaging the other end of said pin;
   a first tab mounted to the other of said core members for laterally maintaining said one end of said pin in engagement with said first support when said core members are fixed together;
   a second tab mounted to the other of said core members for laterally maintaining said other end of said pin in engagement with said second support when said core members are fixed together;
   a third tab mounted to said other core member adjacent to said second support for preventing longitudinal movement of said pin; and
   said first and second supports and said first, second, and third tabs being integrally molded to said core.

* * * * *